April 11, 1950  R. S. TICE  2,503,600
BUILDING HEATING SYSTEM
Filed July 29, 1946
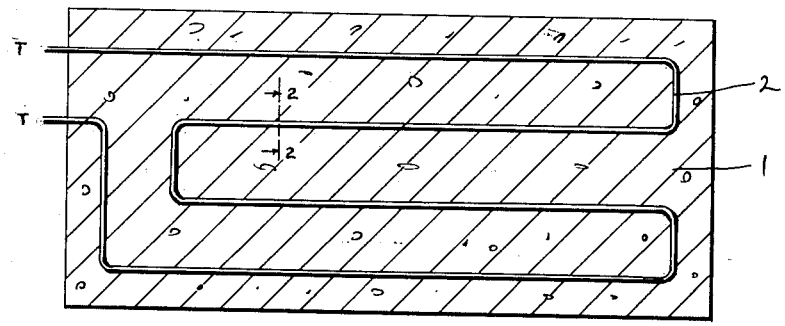
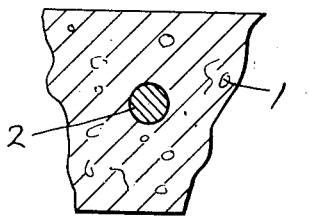
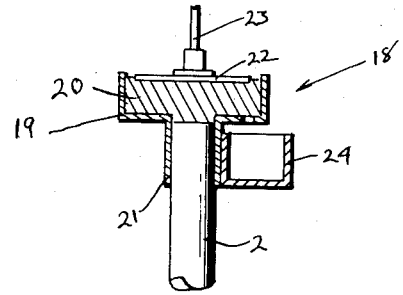
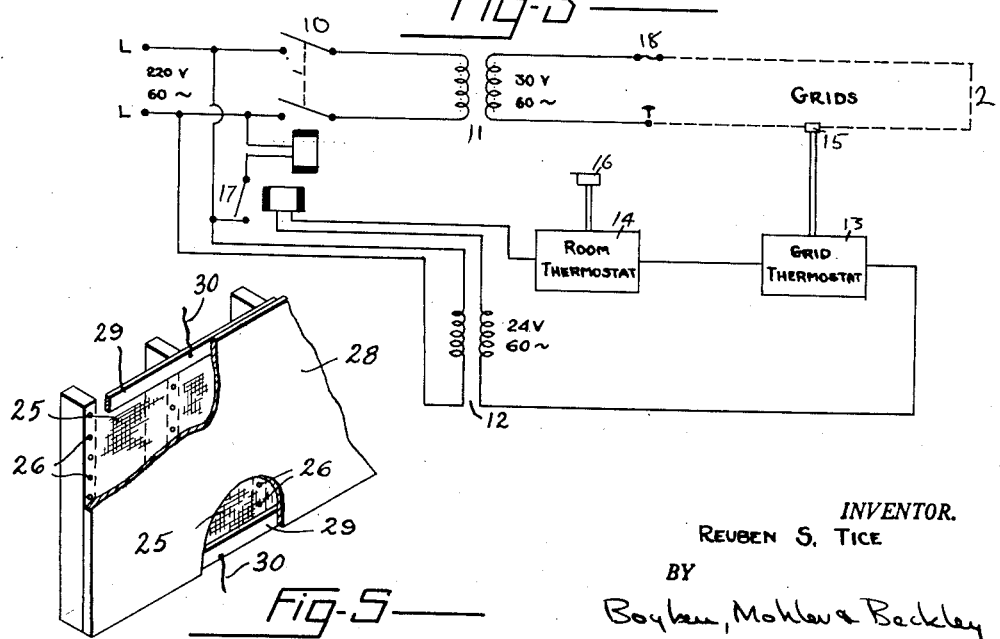
INVENTOR.
REUBEN S. TICE
BY
Boyken, Mohler & Beckley
ATTORNEYS Patented Apr. 11, 1950

2,503,600

UNITED STATES PATENT OFFICE 2,503,600

BUILDING HEATING SYSTEM

Reuben S. Tice, Monterey, Calif.

Application July 29, 1946, Serial No. 686,995

2 Claims. (Cl. 219—20)

This invention relates to a system for heating a building and more particularly to a system for heating a building comprising concrete or plastered wall or floor slabs.

A survey of the art concerning heating systems discloses a wide variety of types and methods, some of which comprise various means of introducing electrical conductors on or in walls and floors which transmit heat into the enclosed room volume. In the past, these systems have required the introduction of specially designed conductors, specially positioned, in order to provide and insure adequate heating. As a consequence, these systems are characterized by high installation cost and their upkeep has been not only expensive but difficult and inconvenient. Repairs often required the dismantling of the floor or wall in order to facilitate work on the conductors.

The present invention has been designed to overcome these difficulties and provides an inexpensive and efficient heating system utilizing the existing elements of concrete or plastered structures. In essence, the invention is a system wherein the conventional reinforcing steel or metal lath, herein generally referred to under the general term of reinforcing rods or grids normally found in concrete or plastered wall or floor slabs are utilized as the electrical conductors and heating elements. In practice, a voltage is applied to terminals connecting with the reinforcing rods or grids of such magnitude that, considering the electrical resistance of the rods, the energy or power is dissipated in the form of heat into the wall or floor and thence to the adjacent atmosphere in the room volume. Suitable thermostatic controls may be provided to cut off the application of voltage to the grids if either the grids themselves or the room exceed pre-set maximum temperatures.

Thus an important object of the invention is a heating system for a building which utilizes the concrete reinforcing rods as electrical conductors for producing heat.

Another object of the invention is a heating system for a building which provides wall or floor heating without the necessity for utilizing special electrical or thermal conductors.

A still further object of the invention is a heating system for a building which utilizes the reinforcing rods as both electrical and thermal conductors and which, by means of thermostats, provides even and uniform heating throughout the room volume.

An even further object of the invention is a heating system for a building having concrete wall or floor slabs in which the reinforcing rod is used as a thermal and electrical conductor to produce inexpensive and efficient heating.

Still another object of the invention is a heating system for a building which is efficient and has low installation and maintenance costs.

An even further object of the invention is a heating system for a building having metal lath in which the lath is used as an electrical conductor to produce heating of the building.

In the drawings:

Fig. 1 is a sectional view through a concrete slab showing the reinforcing rod in place as might be used in the invention.

Fig. 2 is a partial sectional view along the line 2—2 of Fig. 1 showing the rod imbedded in the concrete.

Fig. 3 is a schematic drawing of the electrical circuit used in conjunction with the invention.

Fig. 4 is a detailed sectional view of a form of safety fuse which may be used with the invention.

Fig. 5 is a partial perspective view of a wall or ceiling covered with metal lath and plaster, illustrating the method of electrical connection.

In general, the reinforcing rods or grids, which are utilized in the present invention, are the conventional type used in concrete or plaster construction. The slab with which the invention is concerned may be either a floor, roof or wall slab and one or more may be arranged to heat the enclosed room volume.

A general illustrative view of a concrete slab 1 with the reinforcing conducting rods 2 in place is shown in Fig. 1. The rods may be placed much in the same manner as they are positioned in a conventional slab and may run both lengthwise and/or crosswise. However, since in practicing the invention the reinforcing rods are also used to carry the electric current, it is necessary that one or more paths be established through which the current may flow. These, of course, should be arranged that all are approximately the same length in order that when a predetermined voltage is applied, approximately the same current flow will result and, as a consequence, substantially uniform heating will be produced.

In order to accomplish the above, as has been said, one or more paths may be used. In Fig. 1, a single path is illustrated; but any convenient number could be used and, if desirable, more than one set of terminals may be employed. The terminals as T, T of Fig. 1, are positioned at some convenient edge of the slab where connection to the electrical circuit may readily be made. Regardless of whether one or several current paths are utilized, it is important that the reinforcing steel be so positioned that each path is continuous and without short paths which would divide the current flow. Thus where the reinforcing rods are ordinarily wired or secured together at each crossing, they would be slightly separated in practicing the present invention, and joined only at those points necessary to produce continuous paths of proper length. This separation at the crossings would necessarily have to be insured when the reinforcing rod was placed and before the pouring of the concrete and the ends of each path brought outside the sides of the slab for connection to the electrical circuit. The spacing at the crossings can be insured by the placing of small wooden or other non-conducting blocks between the rods at their adjacent crossing points.

It is also preferable in placing the rods that they be positioned relatively near the surface nearest the room volume to be heated. In practice, the rods are preferably placed from one to two inches from said surface. Thus, in a four inch concrete slab as is illustrated in Fig. 2, the rods would be placed approximately at the center of the slab or slightly nearer said surface than the opposite one in order to insure radiation of the majority of the heat into the room volume.

The amount of heating desired, the dimensions of the conductors and the electrical voltages and currents employed are obviously all related. In general, it has been found desirable to supply alternating current to the grids at a relatively low voltage, the latter being used to eliminate, as much as possible, the necessity for heavy insulation which would be required with higher voltages. Voltages up to 50 volts may quite easily be used without inconvenience, but a preferable value is approximately 30 to 35 volts. Using this, an example may readily be given showing the values required for heating a certain room volume. Suppose that it requires the expenditure of 2500 watts electrical energy to heat a given room volume and that it is desired to apply 30 volts current to ⅝" reinforcing steel rod. It is then desired to know what length of rod is necessary. If I equals current in amperes, W equals power in watts, and E equals voltage in volts, the current required is found by the formula:

$$I = \frac{W}{E} = \frac{2500}{30} = 83.3 \text{ amperes}$$

The total resistance R, in ohms of the conductor may be found by the formula:

$$R = \frac{E}{I} = \frac{30}{83.3} = .360 \text{ ohms}$$

Since, it is known that ⅝" reinforcing rod has a resistance r, of approximately .0009 ohm per foot, the length can be found by the following formula, where L equals the total length in feet:

$$L = \frac{R}{V} = \frac{.360}{.0009} = 400 \text{ feet}$$

Thus, it is seen for the specifications adopted, the application of 83.3 amperes at 30 volts to 373 feet of ⅝" reinforcing rod will supply heating of approximately 2500 watts. Obviously, too, the current and length of the conductor are inversely proportional to one another and either may be reduced by increasing the other. This example is for illustrative purposes only and other values may be adopted to suit particular needs, but it is found that the values chosen give adequate heating for the normal home where the grids are spaced approximately 18" apart without raising the temperature of the concrete to a point where it is dangerous or causes cracking.

Although there are many different circuits by means of which the described heating may be accomplished, the one illustrated and the values indicated in Fig. 3 have been found quite satisfactory and one convenient for most normal installations. Line voltage is supplied at terminals L, L at, in the normal case, 220 volts, 60 cycles, and is applied to a double pole relay 10 for applying the wire voltage to the primary of a transformer 11 is connected to the grids or reinforcing rods 2, through terminal T, shown in dotted lines. Thus, when switch 10 is closed, current, at approximately 30 volts as reduced by transformer 11, is supplied to the grids.

The line voltage is also applied to the primary of transformer 12 whose secondary is connected in a low voltage (24 volts) control circuit. In series with the secondary winding of transformer 12 are two conventional thermostats, a grid thermostat 13, preferably of the bulb type, and a room thermostat 14. The temperature sensitive element 15 of the former is connected directly to one of the grids 2 and preferably imbedded in the concrete slab in order to measure the temperature of the grids at a typical point. The temperature sensitive element 16 of the room thermostat 14 is positioned within the room to be heated at an appropriate and conventional place. Both thermostats are connected in series and so arranged that should the temperature of the elements rise above the predetermined set value, the control circuit is broken. In this connection, it may be noted that ordinarily the grid thermostat may be permanently set at approximately 110° F. which is sufficient and yet considerably below the maximum that the concrete slab will withstand without cracking. The room thermostat is preferably, of course, of the conventional adjustable variety. The coil of a relay 17 is also connected in series in the control circuit and is so arranged that the switch of the relay will be opened when the control circuit is broken by the operation of either of the thermostats.

The switch of relay 17 is connected in series with the coil of the relay 10 which coil is included in a secondary circuit fed from terminals L, L. This secondary circuit is also arranged that so long as relay 17 is closed, relay 10 will also be closed to permit voltage to be applied to transformer 11.

The operation of the circuit is obvious in that both of the thermostats in the low voltage control circuit must be closed in order that relays 17, 10, will be closed. Opening of either thermostat control, caused by a temperature in the room or grid above the desired maximum will open relays 17, 10 and cut off the current being supplied to transformer 11 and the grids 2.

It is also apparent that relay 17 and relay 10 might be confined into a single unit so that the coil of relay 10 would be positioned in the control circuit. This, however, is not normally done because it is desirable to maintain the control circuit as a lower voltage, low current path, which, normally would not be satisfactory for operating the heavy relay 10 in the main line.

As a further element of protection, it has been found desirable to introduce a fuse 18 into the grid circuit as a safety feature in the event of failure of the grid thermostat 13 to operate. This fuse may be of any conventional current or thermal type but the one illustrated in detail in Fig. 4 has been found satisfactory. The one illustrated is of the thermal type and comprises a small container 19 filled with a metal 20 of low melting point. The bottom of the container is provided with an extension 21 arranged to be secured around one end of a grid or rod 2. When the container is filled, the metal rests directly on the end of the grid 2. A contact plate 22 is imbedded in the top surface of metal 20 and connects the grid 2, through the metal 20 to conductor 23, leading to transformer 11. The container 19 is provided with a small hole at one edge and a cup 24 is positioned directly underneath the hole. If for some reason, the grid thermostat fails to operate or relay 10 does not operate properly, the increased temperature of grid 2 will cause the metal 20 to melt and run out into the cup 24. This will break the contact between the grid 2 and conductor 23, eliminating further current flow into the grids. When the defective operation has been remedied, the metal in the cup 24 may be melted and replaced in the container 19.

In practice, the fuse is placed adjacent transformer 11, usually positioned near one terminal of the grid path and enclosed to prevent connection or conduction through the air. In the normal case, the metal 20 is chosen to have a melting temperature of 150° to 160° F. which is still below the temperature at which the grids are likely to crack the concrete slab. Thus, overheating of the rods for any reason is prevented before any critical temperature is reached.

Fig. 5 illustrates a form of the invention in which metal lath serves as the grid or conductors. The lath 25 is conventionally attached by means of nails or pins 26 to the studding 27 and the conventional plaster layer 28 is added to the lath. However, in order to provide for a uniform current flow and heating, the electrical circuit terminal T is connected to the lath 25 by means of conducting bus bars 29 and wires 30. These bars are secured, as by welding, soldering, etc., to the metal lath to provide electrical connection at each end. They are sufficiently heavy and with sufficiently low resistance to insure uniform voltage throughout their length and thus supply approximately an evenly distributed current into the strands of the lath. Obviously, the number of terminals and separate bus bars utilized depends upon the type of lath used and its resistance and for this purpose, the formulas given above are generally acceptable for the necessary calculations.

I claim:

1. In an electrical heating system for a room having a concrete floor, an elongated heating grid of ferrous material imbedded within said floor having spaced runs extending substantially between opposite edges of said floor and connected by return bends adjacent said edges, a first step-down transformer having its secondary connected with said grid for induction of relatively low voltage and relatively high amperage current in said grid for heating the latter, an electrical control circuit, a second step-down transformer having its secondary connected with said circuit for inducing a low voltage current therein, a relatively high voltage source of electricity connected with the primary of said second transformer, a relay switch between said source and the primary of said first transformer actuatable by flow of current in said circuit for connecting said source with the primary of said second transformer, a pair of normally closed thermally actuatable switches in said circuit, a thermostat responsive to grid temperature for opening one of said thermally actuatable switches upon a predetermined rise in temperature in said grid and a thermostat responsive to the temperature of the space within said room for opening the other of said thermally actuatable switches upon a predetermined rise in the temperature of the air in said space.

2. In an electrical heating system for a room having a floor, an electrical heating element within said floor having terminals for connecting the same with a source of power, a control circuit comprising an electrical conductor having a pair of normally closed thermally actuatable switches therein, a pair of thermostats respectively responsive to grid temperature and the temperature of the space within said room for opening one of said thermally actuatable switches upon a predetermined rise in the temperature of said grid and for opening the other of said thermally actuatable switches upon a predetermined rise in the temperature of the air in said space, a source of relatively high voltage current for providing current for said element and said conductor and a step down transformer having its secondary coil connected with said terminals whereby the current induced to flow in said element will be of relatively low voltage and will be isolated from said source against the generation of detrimental stray currents within said floor, a second step-down transformer between said source and said conductor having its secondary coil connected with the latter including a relatively low voltage current in said conductor, and a normally open relay switch between the primary coil of said first mentioned transformer and said source actuatable by current flowing in said conductor for closing and thereby connecting said primary coil with said source only when said pair of thermally actuatable switches are closed.

REUBEN S. TICE.

REFERENCES CITED

The following references are of record in the file of this patent:

UNITED STATES PATENTS

| Number | Name | Date |
|---|---|---|
| 863,211 | Paul | Aug. 13, 1907 |
| 1,171,254 | Ruckle | Feb. 8, 1916 |
| 1,820,612 | Good et al. | Aug. 25, 1931 |
| 1,886,439 | Wells | Nov. 8, 1932 |
| 1,979,082 | Schwedenberg et al. | Oct. 30, 1934 |
| 2,042,742 | Taylor | June 2, 1936 |
| 2,080,799 | Wiegand | May 18, 1937 |
| 2,149,871 | Rohr | Mar. 7, 1939 |
| 2,165,970 | Jaspers | July 11, 1939 |
| 2,209,768 | Dillman | July 30, 1940 |
| 2,428,568 | Hill | Oct. 7, 1947 |

FOREIGN PATENTS

| Number | Country | Date |
|---|---|---|
| 452,923 | Great Britain | Sept. 1, 1936 |